Patented June 26, 1934

1,964,017

UNITED STATES PATENT OFFICE 1,964,017

UTILIZING PURIFIED MUSA FIBER CELLULOSE

Edward Chauncey Worden, 1st, Wyoming, Millburn Township, Essex County, N. J., assignor to Hanson & Orth, New York, N. Y., a firm composed of Charles D. Orth, Sr., Charles D. Orth, Jr., Michael J. Smith, and William Knight, Jr.

No Drawing. Application November 29, 1930, Serial No. 499,129

13 Claims. (Cl. 260—145)

This invention relates to a process for the production of nitric esters of cellulose, by the utilization of highly purified cellulose obtained from Musa fiber.

It has been shown that a highly purified cellulose may be obtained from Musa fiber, high in alpha-cellulose content and relatively low in hemi-celluloses and other cellulosic bodies of inferior strength, and it has furthermore been shown that such alpha-cellulose especially in the esterified condition, is extraordinarily strong and readily susceptible to esterification with the production of esters in which the unusually high tensile strength and other desirable physical characteristics of the alpha-cellulose, are transmitted to the ester form substantially unimpaired, and sometimes considerably augmented.

It has also been shown that, operating with highly purified alpha-cellulose properly prepared from the Musa group of fibers, a wide variety of nitrated celluloses may be obtained, especially applicable for explosive, plastic, lacquer, imitation leather or artificial filament use, either in the nitrated form, or after the nitric ester has been substantially removed therefrom.

One of the objects of this invention is the disclosure of a method for the preparation of nitric esters using the alpha-cellulose obtained from purified Musa fiber, in the production of a nitric ester which exhibits unusually high tensile strength and elasticity, ready solubility in a variety of readily obtained and relatively inexpensive solvents and solvent combinations, and a high stability in the ester form under varying climatic conditions, this invention being specifically directed to the esterification of purified cellulose obtained from Musa fibers relatively high in alpha-cellulose, especially esterification with inorganic acids such as nitric acid in conjunction with dehydrating bodies, and to the products produced thereby and therefrom.

As an illustrative example of carrying my invention into effect I may proceed along the following lines, it being understood that this illustrative method may be varied within comparatively wide limits and still conserve the essence and spirit of my invention, which is the preparation and utilization of nitric esters of highly purified cellulose obtained from Musa fiber.

1. *Cellulose.*—I prefer to employ the highly purified cellulose obtained from Musa fiber as described in Patents Nos. 1,814,106, and 1,866,917, said cellulose comprising 93%–98% alpha-cellulose, and substantially no ash and ether-extract. The original purified fiber shows strengths as high as equivalent to 8 grams per denier and sometimes higher, when in the purified state.

In the esterification of cellulose obtained from the purification of Musa fiber, it is imperative for best results, that the cellulose employed should contain the maximum amount of alpha-cellulose or resitant cellulose, be substantially free from oxycellulose and contain the minimum of beta-cellulose and hemicellulosic bodies. In order to obviate or minimize the formation of oxy-cellulose and oxidized cellulosic bodies or at least to minimize their formation to a negligible quantity, I prefer to use purified Musa fiber cellulose for esterification purposes in the "half" or "three-quarters" bleached condition.

The cellulose, preferably in the flock form for greater ease of acid penetration, is dried at comparatively low temperatures (preferably below 100° C.) until the bone dry condition has been reached, then allowed to cool in substantially airtight containers until ready for use. Being unusually light, fluffy and more porous than the celluloses normally used for esterification, penetration of nitrating mixture is almost instantaneous, and hence the esterification is uniform.

2. *Esterification mixture.*—A wide latitude of nitric and sulfuric acid percentages are required, as well known to those skilled in the art of cellulose esterification, depending upon the use to which the nitrated product is to be put, especially those factors of solubility and viscosity which govern the application in a great measure the suitability of a nitrocellulose for a definite purpose. For general lacquer nitrocellulose, I prefer to employ a mixture comprising 23%–25% nitric acid, 54%–58% sulfuric acid, and 23%–17% water, the cellulose being introduced into the esterifying bath at a temperature of about 45° C., quickly and thoroughly stirred into the acid mixture and kept at a temperature of 45°–50° C. for 30–40 minutes, depending upon atmospheric conditions, and the method of nitration employed. The nitrated cellulose is then "drowned" in a large volume of cold water, washed until but faintly acid, boiled in water for 2 to 4 hours, washed with weak sodium carbonate solution, disintegrated, washed to neutrality, centrifugalized, and the remaining water contained therein removed by drying, or by solvent displacement.

Thus prepared nitrated Musa cellulose is a light, fluffy, porous neutral powder, readily receptive to solvents and solvent combinations, and meeting the usual specifications for stability. The solution may vary within wide limits as to viscosity depending upon the treatment or treatments to which it has been subjected for this purpose, either in esterified or non-esterified condition or in the dissolved or undissolved state or both. The nitric esters obtained are readily soluble in ethyl acetate, propyl acetate, butyl acetate, amyl acetate, acetone, diacetone alcohol, and in mixtures of the same with aliphatic or carbocyclic hydrocarbons and other non-solvent combinations, diluents, plasticizers and flexilizers. Readily combines with camphor, camphor substitutes and other thermo-plastic-inducing bodies to form celluloids. The tensile strength of filaments from an acetone solution, show a dry strength on the Schopper machine of 2 to 3 grams per denier and better. The viscosity of nitrated Musa fiber in solution, as compared with esterified cotton cellulose prepared in the same manner, is much lower, and the solubility more ready and complete.

In comparison with the use of cotton cellulose (usually considered as the standard cellulose for esterification purposes, and the purest form of naturally occuring cellulose), esters especially the inorganic esters as those of nitric acid, with Musa fiber cellulose also in the esterified condition, the latter present many advantages, such as the following:—

1. The raw material in the purified form based upon the relative tenacity, and tensile strength, is normally less.

2. The increased fluffiness, porosity and receptivity for esterizing agents of Musa cellulose results in a more nearly instantaneous and uniform esterification, and one in which the resulting ester formed has a high degree of stability with a minimum purification treatment.

3. Nitrocelluloses produced from Musa cellulose possess a diminished viscosity without corresponding loss in tensile strength and other desirable physical and technical characteristics, and a more active and more nearly complete solubility in the usual cellulose ester solvents, diluents, solvent combinations and softening and plasticizing bodies, either liquid or solid.

4. An ester, highly uniform in properties and composition is producable indefinitely on a manufacturing scale either by the pot, centrifugal or displacement systems of nitration, intermittently or by the continuous process.

5. Solutions of the ester, especially in acetone or in a mixture of ethyl acetate-benzene or butyl acetate-toluene are readily filterable to very clear solutions, and in filament formation therefrom, stoppage of spinnerette orifices by insoluble or colloidal matter is reduced to a minimum.

6. Lacquers, either straight pyroxylin, or with flexilizers, softeners, suppleness-inducing bodies or plastifiers, are exceedingly strong, tenacious and admit of great wearing without flaking, peeling or otherwise disintegrating.

Having now described my invention and in what manner it may be performed what I desire to secure by Letters Patent is:—

1. A process for the manufacture of cellulose nitrates from Musa fiber cellulose comprising treating said cellulose with nitrating mixture at esterifying temperature for 30–40 minutes.

2. A process for the manufacture of cellulose nitrate from alpha-cellulose from Musa fiber comprising treating said cellulose in the bone dry condition with nitric acid esterifying mixture at a temperature of about 45° C.

3. A process for the manufacture of nitrocellulose from highly purified Musa fiber cellulose comprising treating said cellulose previously dried and cooled with nitric acid and sulfuric acid at a temperature of about 45° C. for 30–40 minutes, then removing acid and stabilizing, removing excess of water therefrom.

4. A process for the manufacture of nitrated cellulose from purified Musa fiber cellulose comprising treating said cellulose with nitric acid and sulphuric acid at a temperature of about 45° C. then removing acid and stabilizing by ways now known, removing excess of water therefrom.

5. A process for the manufacture of inorganic cellulose nitrates from Musa fiber cellulose containing at least 93% alpha-cellulose comprising treating said cellulose in the bone dry condition with nitric acid and sulphuric acid at a temperature of about 45° C. for 30–40 minutes, then removing acid and stabilizing and removing excess of water therefrom.

6. A process for the manufacture of cellulose nitrate from Musa fiber cellulose comprising treating said cellulose previously dried and cooled with a mixture of 23%–25% nitric acid, 54%–58% sulfuric acid and 23%–17% water at a temperature of about 45% C. then removing acid and stabilizing, removing excess of water therefrom.

7. A process for the manufacture of nitrocellulose from alpha-cellulose from Musa fiber comprising treating said cellulose with nitrating mixture at about 45° C. for 30–40 minutes, then removing acid and stabilizing, removing excess of water therefrom.

8. A process for the manufacture of nitrated cellulose from highly purified Musa fiber cellulose comprising treating said cellulose in the bone dry condition with nitric acid esterifying mixture at a temperature of about 45° C. then removing acid and stabilizing by ways now known, removing excess of water therefrom.

9. A process for the manufacture of cellulose nitric esters from purified Musa fiber cellulose comprising treating said cellulose previously dried and cooled with nitric acid and sulfuric acid at a temperature of about 45° C. for 30–40 minutes, then removing acid and stabilizing, removing excess of water therefrom.

10. A process for the manufacture of cellulose nitrate from Musa fiber cellulose containing at least 93% alpha-cellulose comprising treating said cellulose with nitric acid and sulphuric acid at a temperature of about 45° C. then removing acid and stabilizing, removing excess of water therefrom.

11. A process for the manufacture of nitrocellulose from Musa fiber cellulose comprising treating said cellulose in the bone dry condition with nitric acid and an inorganic acid at a temperature of about 45° C. for 30–40 minutes, then removing acid and stabilizing, removing excess of water therefrom.

12. A process for the manufacture of nitrated cellulose from alpha-cellulose from Musa fiber comprising treating said cellulose previously dried and cooled with a mixture of 23%–25% nitric acid, 54%–58% sulfuric acid and 23%–17% water at a temperature of about 45° C. then removing acid and stabilizing, removing excess of water therefrom.

13. Nitrated high alphacellulose obtained from Musa fiber.

EDWARD CHAUNCEY WORDEN, I.